United States Patent
Boran et al.

(10) Patent No.: US 10,166,993 B2
(45) Date of Patent: Jan. 1, 2019

(54) CUSTOMER DRIVING MODE FOR VEHICLES

(71) Applicant: Ford Global Technologies, LLC, Dearborn, MI (US)

(72) Inventors: Lisa Therese Boran, Northville, MI (US); Kevin Thomas Hille, Plymouth, MI (US); Aldi Caushi, Northville, MI (US); James Michael Weinfurther, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/749,692

(22) PCT Filed: Aug. 5, 2015

(86) PCT No.: PCT/US2015/043790
§ 371 (c)(1),
(2) Date: Feb. 1, 2018

(87) PCT Pub. No.: WO2017/023311
PCT Pub. Date: Feb. 9, 2017

(65) Prior Publication Data
US 2018/0222489 A1    Aug. 9, 2018

(51) Int. Cl.
*G08B 13/00* (2006.01)
*B60W 50/00* (2006.01)
(Continued)

(52) U.S. Cl.
CPC ..... *B60W 50/0098* (2013.01); *B60H 1/00878* (2013.01); *G06F 21/30* (2013.01);
(Continued)

(58) Field of Classification Search
CPC .......... B60W 50/0098; B60W 50/085; B60W 2050/0077; G06F 21/00; G08C 17/02; F01P 2025/12
(Continued)

(56) References Cited

U.S. PATENT DOCUMENTS

| 4,831,868 A | 5/1989 | Makino |
| 6,237,111 B1 | 5/2001 | Gambino |

(Continued)

FOREIGN PATENT DOCUMENTS

EP    2703236 A1    3/2014

OTHER PUBLICATIONS

International Preliminary Report on Patentability for PCT Application No. PCT/US2015/043790 dated Aug. 23, 2017.
International Search Report and the Written Opinion for PCT Application No. PCT/US2015/043790 dated Nov. 2, 2015.

*Primary Examiner* — Toan N Pham
(74) *Attorney, Agent, or Firm* — James P. Muraff; Neal, Gerber & Eisenberg LLP

(57) ABSTRACT

An access assessment tool is described for providing a technical solution for selectively controlling access to restricted information and/or implementation of restricted functionalities based on a current vehicle mode and/or validated credentials. The access assessment tool described herein controls the validation of a user or diagnostic tool requesting access to restricted information or implementation of a restricted function before allowing access to the restricted information or allowing implementation of the restricted function.

20 Claims, 6 Drawing Sheets

(51) Int. Cl.
  *G06F 21/30* (2013.01)
  *H04L 29/06* (2006.01)
  *B60H 1/00* (2006.01)
  *G06F 21/44* (2013.01)
  *G07C 5/08* (2006.01)
  *H04L 12/40* (2006.01)

(52) U.S. Cl.
  CPC ......... *G06F 21/445* (2013.01); *G07C 5/0808* (2013.01); *H04L 12/40* (2013.01); *H04L 63/10* (2013.01); *B60W 2050/0082* (2013.01); *B60W 2050/0083* (2013.01); *B60W 2050/0085* (2013.01); *G06F 2221/2141* (2013.01); *H04L 2012/40215* (2013.01); *H04L 2012/40273* (2013.01)

(58) Field of Classification Search
  USPC ................ 340/5.74, 4.31, 449; 701/36, 103; 726/19, 28
  See application file for complete search history.

(56) References Cited

U.S. PATENT DOCUMENTS

| | | |
|---|---|---|
| 6,430,488 B1 | 8/2002 | Goldman et al. |
| 9,956,939 B2 * | 5/2018 | Chen ................ H04M 1/72522 |
| 2001/0020202 A1 | 9/2001 | Obradovich et al. |
| 2003/0098784 A1 | 5/2003 | Van Bosch et al. |
| 2004/0158371 A1 * | 8/2004 | Iggulden ............. B60R 16/0231 379/102.03 |
| 2005/0093674 A1 | 5/2005 | Wackerl et al. |
| 2008/0059806 A1 | 3/2008 | Kishida et al. |
| 2010/0131642 A1 | 5/2010 | Chalikouras et al. |
| 2010/0280932 A1 | 11/2010 | Jensen et al. |
| 2011/0083161 A1 | 4/2011 | Ishida et al. |
| 2012/0316743 A1 | 12/2012 | DeSanzo et al. |
| 2013/0111582 A1 | 5/2013 | Forest |
| 2013/0238670 A1 | 9/2013 | Amirpour et al. |
| 2014/0324321 A1 | 10/2014 | Steen et al. |
| 2017/0287322 A1 * | 10/2017 | Drake .................... G08C 17/02 |

* cited by examiner ly controlling access to restricted information and/or implementation of restricted functionalities based on a current vehicle mode and/or validated credentials. The access assessment tool described herein may be configured to validate a user or diagnostic tool requesting access to restricted information or implementation of a restricted function before allowing access to the restricted information or allowing implementation of the restricted function.

CUSTOMER DRIVING MODE FOR VEHICLES

CROSS-REFERENCE TO RELATED APPLICATIONS

This is the National Stage of International Application No. PCT/US2015/043790, filed on Aug. 5, 2015 and titled "Customer Driving Mode for Vehicles," which is incorporated by reference in its entirety.

BACKGROUND

Vehicles may include a computing device configured to store vehicle information that can be referenced during operation of the vehicle. While accessing vehicle information and enabling modification of vehicle information may be part of routine vehicle operation, in certain scenarios of vehicle operation it may be preferable to restrict access to, and prevent modification to, certain vehicle information.

It follows that this disclosure generally relates to a vehicle including components for controlling access to certain restricted information and implementation of certain restricted functions.

SUMMARY

The vehicle components, and more specifically the access assessment tool, described herein are specially configured to provide a technical solution for selectively controlling access to restricted information and/or implementation of restricted functionalities based on a current vehicle mode and/or validated credentials. The access assessment tool described herein may be configured to validate a user or diagnostic tool requesting access to restricted information or implementation of a restricted function before allowing access to the restricted information or allowing implementation of the restricted function.

Exemplary embodiments provide a vehicle comprising a memory configured to store restricted information, a vehicle module configured to operate based on the restricted information, a gateway interface, and a processor enabled to communicate with the memory and gateway interface. The processor may be configured to receive an access request for access to the restricted information, and determine whether to allow access to the restricted information based on the access request.

According to some embodiments, a vehicle comprising a memory configured to store restricted information, a vehicle module configured to operate based on the restricted information, a gateway interface, and a processor enabled to communicate with the memory and gateway interface is disclosed. The processor may be configured to receive a modification request for modifying the restricted information, and determine whether to allow modification of the restricted information based on the modification request.

According to some embodiments, a method for authenticating a request for access to information stored on a vehicle computing device is disclosed. The method may include storing restricted information on a memory unit, receiving an access request for access to the restricted information from an access device coupled to a data access interface; authenticating the access device based on the access request; and enabling the access device to access the restricted information based on the authentication.

This application is defined by the appended claims. The description summarizes aspects of embodiments of the disclosure and should not be used to limit the claims. Other implementations are contemplated in accordance with the techniques described herein, as will be apparent upon examination of the following drawings and description, and such implementations are intended to be within the scope of this disclosure.

BRIEF DESCRIPTION OF THE DRAWINGS

For a better understanding, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

Figure 1:
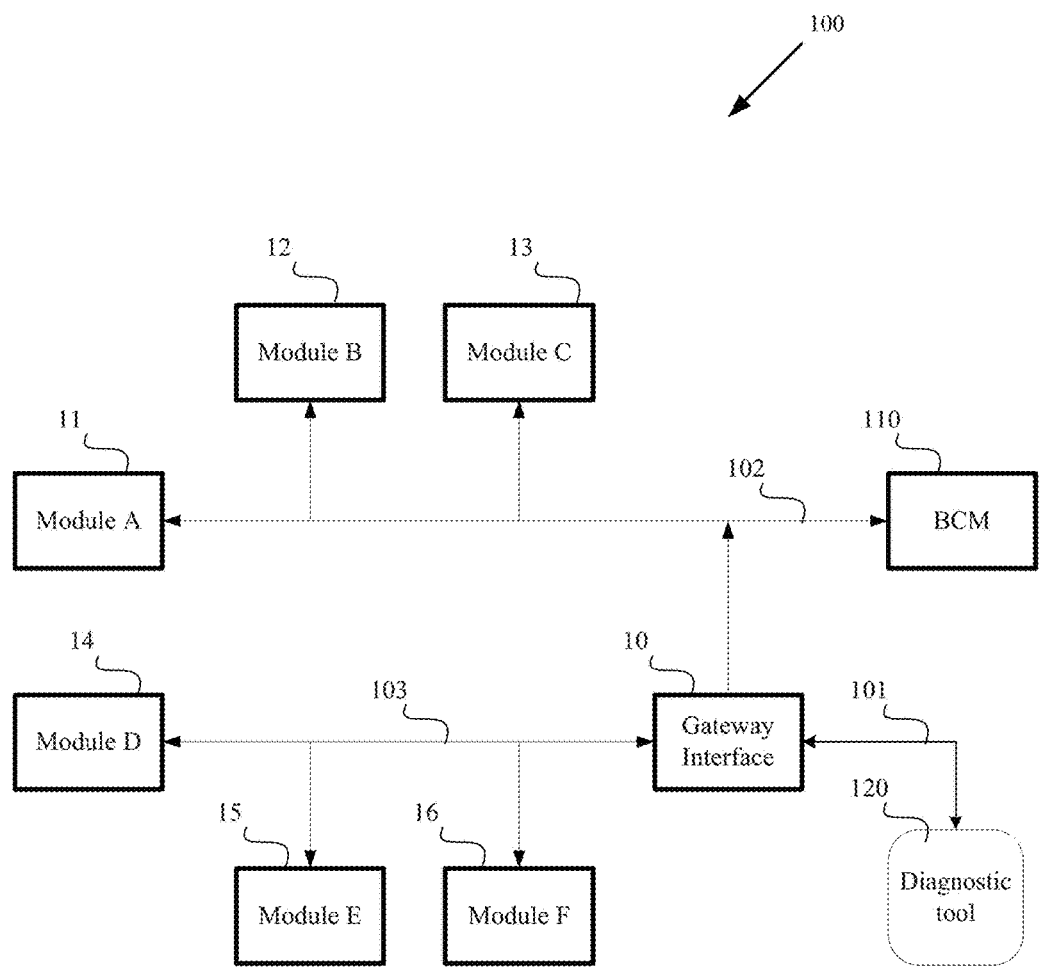
FIG. 1 illustrates an exemplary block diagram of a vehicle system communicating with a diagnostic tool.

There are shown in the drawings, and will hereinafter be described, some exemplary and non-limiting embodiments, with the understanding that the present disclosure is to be considered an exemplification and is not intended to limit the features described herein to the specific embodiments illustrated. Not all of the components described in this disclosure may be required, however, and some implementations may include additional, different, or fewer components from those expressly described in this disclosure. Variations in the arrangement and type of the components may be made without departing from the spirit or scope of the claims as set forth herein.

With the continued advancements in automotive technology, the computing capabilities found in vehicles have correspondingly increased. The exemplary vehicle described herein is a passenger vehicle equipped with a specialized computing device capable of implementing the features described herein. For example, the specialized computing device may be a body control module (BCM) equipped in the vehicle to communicate with a plurality of vehicle modules within a controller area network (CAN). A CAN bus may be used to connect the BCM to the plurality of vehicle modules.

FIG. 1 illustrates an exemplary vehicle CAN 100. Vehicle CAN 100 includes gateway interface 10, body control module (BCM) 110, vehicle module A 11, vehicle module B 12, vehicle module C 13, vehicle module D 14, vehicle module E 15, and vehicle module F 16. The components that comprise vehicle CAN 100 illustrated in FIG. 1 may be connected through a first CAN bus 102 and a second CAN bus 103. BCM 110 may be a computing device such as an electronic control unit configured to control one or more vehicle systems represented by the various vehicle modules illustrated in FIG. 1. The BCM 110 may further include, or be configured to communicate with, a memory unit such as a main memory and/or a static memory for storing digital information described herein. The memory unit can include a solid-state memory such as a memory card or other package that houses one or more non-volatile read-only memories, such as flash memory. Further, the medium unit can be a random access memory or other volatile re-writable memory. Additionally, the medium unit can include a magneto-optical or optical medium, such as a disk or tapes or other storage device to capture information communicated over a transmission medium.

Gateway interface 10 is in communication with module D 14, module E 15, and module F 16 via the second CAN bus 103. Gateway interface 10 may include an on-board diagnostic connector interface configured to receive a connection with diagnostic tool 120. The diagnostic connector interface on gateway interface 10 may be in accordance to the OBD II standard, or other known vehicle diagnostic connection standards. Diagnostic tool 120 is an external tool utilized by, for example, a service technician during a maintenance or diagnostic operation on the vehicle. In other words, diagnostic tool 120 is not a native component vehicle CAN 100. Even so, gateway interface 10 enables diagnostic tool 120 to connect to vehicle CAN 100 and request access to the different modules, controllers, and information included in vehicle CAN 100. Gateway interface 10 may further include a network interface configured to enable communication with an external computing device such as, for example, an external server. The network interface may allow for wired or wireless communication with external computing devices via one or more of the following protocol technologies: 2G, 3G, 4G, Universal Mobile Telecommunications System (UMTS), GSM (R) Association, Long Term Evolution (LTE), WiMAX, Bluetooth, near field communication (NFC), WiFi (including 802.11 a/b/g/n/ac or others), WiGig, or Global Positioning System (GPS) networks.

Gateway interface 10 is further in communication with module A, module B, module C, and BCM 110 via a first CAN bus 102. Each of the exemplary vehicle modules illustrated in FIG. 1 may represent a combination of one or more of software, hardware, and/or firmware corresponding to vehicle systems such as a power window system, a navigation system, an entertainment system, a temperature control system, a power locking system, a power seat system, a vehicle speed control system, and other vehicle systems found on the vehicle. Each of the exemplary vehicle modules may include sensors for sensing information related to their respective vehicle system (e.g., state information identifying a current state of a component within the respective vehicle system). For example, the power window system may include a window sensor for sensing window position state information, the navigation system may include location sensors for identifying a current vehicle position information, the entertainment system may include various sensors for identifying state information for components within the entertainment system (e.g., volume sensors for identifying current volume information, entertainment output information for identifying the current source of entertainment being output by the entertainment system), the temperature control system may include temperature sensors for sensing the current temperature within the vehicle cabin and/or external temperature, the power locking system may include lock sensors for sensing door lock state information, the power seat system may include seat position sensors for sensing seat position state information, and the vehicle speed control system may include a speed sensor for obtaining the current traveling speed of the vehicle.

Throughout the lifetime of the vehicle, the vehicle may find itself in various different stages where the vehicle is programmed to operate under a specified mode corresponding to a current stage of the vehicle. It follows that a predetermined vehicle mode may be assigned to correspond to a specific stage within the lifetime of the vehicle. In addition, each vehicle mode may be pre-programmed to have specified access settings that controls access to restricted information and access to implement restricted functions For example, the vehicle may be programmed to operate under a Factory Mode while the vehicle is first being built and located within a vehicle factory. While in the Factory Mode, the vehicle may be configured to limit certain vehicle systems to reduce power use and to limit certain vehicle capabilities that may not be needed during the construction of the vehicle or while the vehicle is still located at the vehicle factory. In addition, according to a default access setting of the Factory Mode, a user or requesting device may be allowed unrestricted access to all information, including information classified as restricted information (e.g., diagnostic identifier data (DID), and unrestricted capability to change vehicle functions, including functions classified as restricted functions (e.g. direct memory read functions). Alternatively, the default access setting of the Factory Mode may allow a user restricted access to information and restricted capability to change restricted functions, where the user or requesting device has to provide security credentials that are authenticated before being allowed to access restricted information and being allowed to implement restricted functions. According to some embodiments, the default access setting for the Factory Mode may also be changed after authentication of security credentials. The process for gaining access to restricted information and implementing restricted functions is described in more detail with respect to flow chart 200 and flow chart 300 illustrated in FIG. 2 and FIG. 3, respectively.

The vehicle may also be programmed to operate under a Transport Mode while the vehicle is being transported from the vehicle factory to a dealership location. While in the Transport Mode, the vehicle may be configured to limit certain vehicle systems to reduce power use and to limit certain vehicle capabilities that may not be needed during the construction of the vehicle or while the vehicle is still located at the vehicle factory. In addition, according to a default access setting of the Transport Mode, a user or requesting device may be allowed unrestricted access to all information, including information classified as restricted information (e.g., diagnostic identifier data (DID), and unrestricted capability to change vehicle functions, including functions classified as restricted functions (e.g. direct memory read functions). Alternatively, the default access setting of the Transport Mode may allow a user restricted access to information and restricted capability to change restricted functions, where the user or requesting device has to provide security credentials that are authenticated before being allowed to access restricted information and being allowed to implement restricted functions. According to some embodiments, the default access setting for the Transport Mode may also be changed after authentication of security credentials. The process for gaining access to restricted information and implementing restricted functions is described in more detail with respect to flow chart 200 and flow chart 300 illustrated in FIG. 2 and FIG. 3, respectively.

The vehicle may also be programmed to operate under a Service Mode after the vehicle arrives at the dealership or when the vehicle ownership is transferred to a buyer. According to some embodiments, this mode may also be named a Normal Mode. While in the Service Mode, the vehicle may enable all approved passenger vehicle capabilities to ensure the buyer full enjoyment of the vehicle. According to a default access setting of the Service Mode, a user or requesting device may be allowed unrestricted access to all information, including information classified as restricted information (e.g., diagnostic identifier data (DID), and unrestricted capability to change vehicle functions, including functions classified as restricted functions (e.g. direct memory read functions). However, more likely, the default access setting of the Service Mode will be set to a restricted access where information classified as restricted information and functions classified as restricted functions may be restricted. As in the other Modes, the access setting may be changed by a user (from a restricted mode to an unrestricted mode, or vice versa) after authentication credentials are authenticated. For example, a user operating the diagnostic tool 120 may connect with the gateway interface 10 and request a change to the current access setting. The processes for changing access settings, gaining access to restricted information, and implementing restricted functions are described in more detail with respect to flow chart 200, flow chart 300, flow chart 400A, and flow chart 400B illustrated in FIG. 2, FIG. 3, FIG. 4A, and FIG. 4B respectively.

An access assessment tool may be included for analyzing a request for accessing restricted information and/or implementing restricted functions for modifying restricted information, and determining whether to allow such access or implementation. The access assessment tool may be a program or application stored within a memory included in vehicle CAN 100 and executed by a processor of the BCM 110. The access assessment tool may also be some combination of software and hardware, incorporated on one or more of the components that comprise BCM 110. Alternatively, the access assessment tool may be incorporated on one or more components that comprise another vehicle module within vehicle CAN 100. Further description for the access assessment tool and the components of vehicle CAN 100 involved in running the access assessment tool is described in more detail below.

Figure 2:
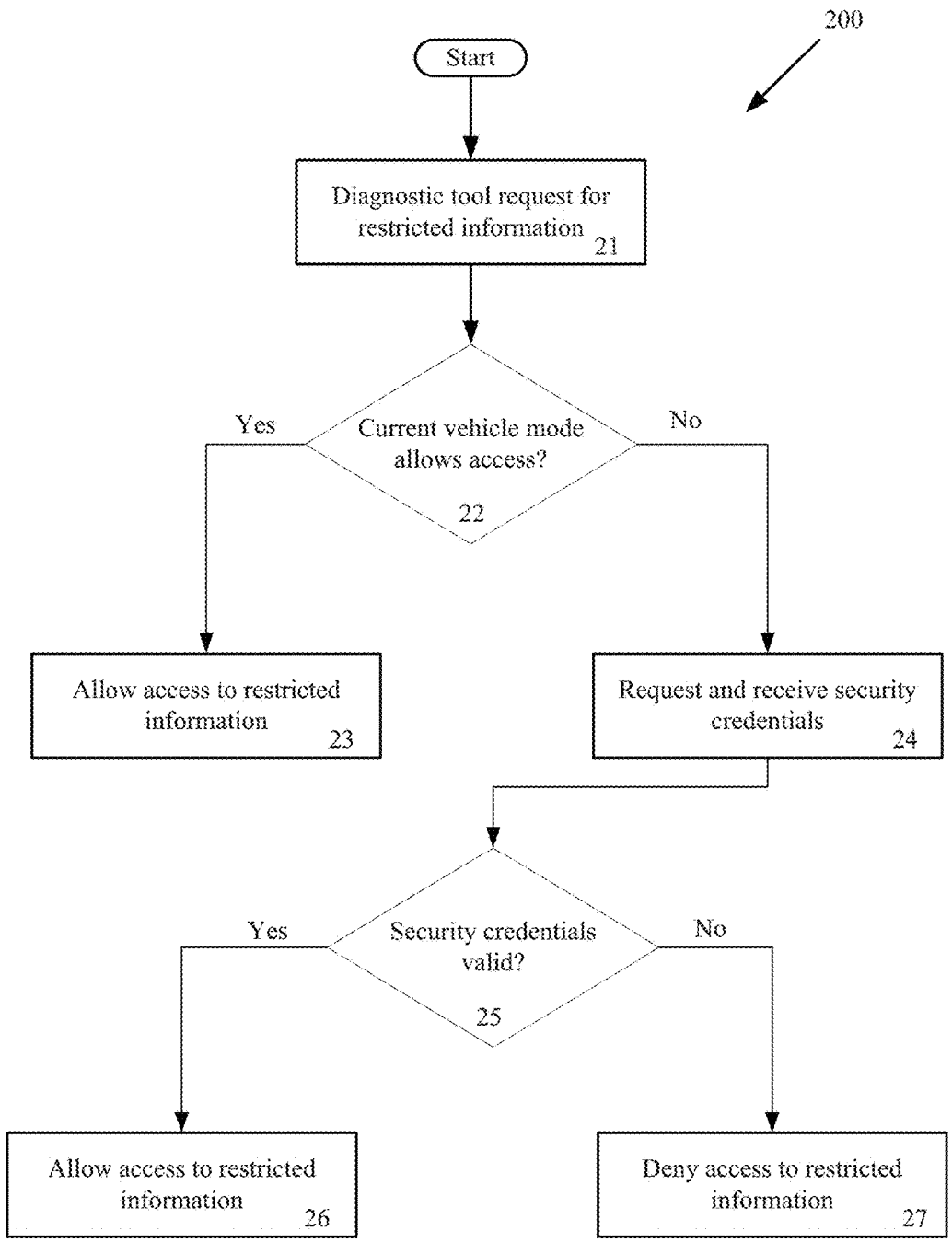
FIG. 2 illustrates a flow chart describing a process implemented by an access assessment tool, according to some embodiments.

FIG. 2 illustrates flow chart 200 that describes a process for determining whether to allow access to restricted data according to some embodiments. The process described by flow chart 200 describes exemplary steps that may be implemented by the access assessment tool for determining whether to allow access to restricted data stored on a memory unit included within vehicle CAN 100. The steps of the process described below is provided for exemplary purposes, as it is within the scope of this disclosure for the access assessment tool to implement a greater, or fewer, number of steps.

A diagnostic tool (e.g., diagnostic tool 120) may connect to a gateway interface (e.g., gateway interface 10) and request access to restricted information at 21. The access request may include security credential information that identifies the credentials for the user and/or diagnostic tool 120 attempting to access the restricted information. The credentials may be a password or other identifier related to the user or diagnostic tool 120.

At 22, the access assessment tool determines a current vehicle mode. For example, the current vehicle mode may be one of the Factory Mode, the Transport Mode, or the Service Mode described herein. After determining the current vehicle mode, the access assessment tool determines whether the current vehicle mode allows access to the restricted information. For example, if the current access setting for the current vehicle mode is the unrestricted access setting that allows access to the restricted data, the access assessment tool may proceed to 23 where the diagnostic tool 120 is allowed access to restricted information. Alternatively, if the current vehicle mode's current access setting is the restricted access setting that does not allow for access to restricted information without authenticated security credentials, the access assessment tool may proceed to 24.

If the current vehicle mode does not permit access to restricted information, then the access assessment tool may proceed to 24 where a request for security credentials is implemented. In some embodiments, the request for security credentials may be transmitted by the BCM 110 back to the diagnostic tool 120. In other embodiments, the security credential information may have been included in the initial request for restricted information transmitted by the diagnostic tool 120 at 21.

Figure 5:
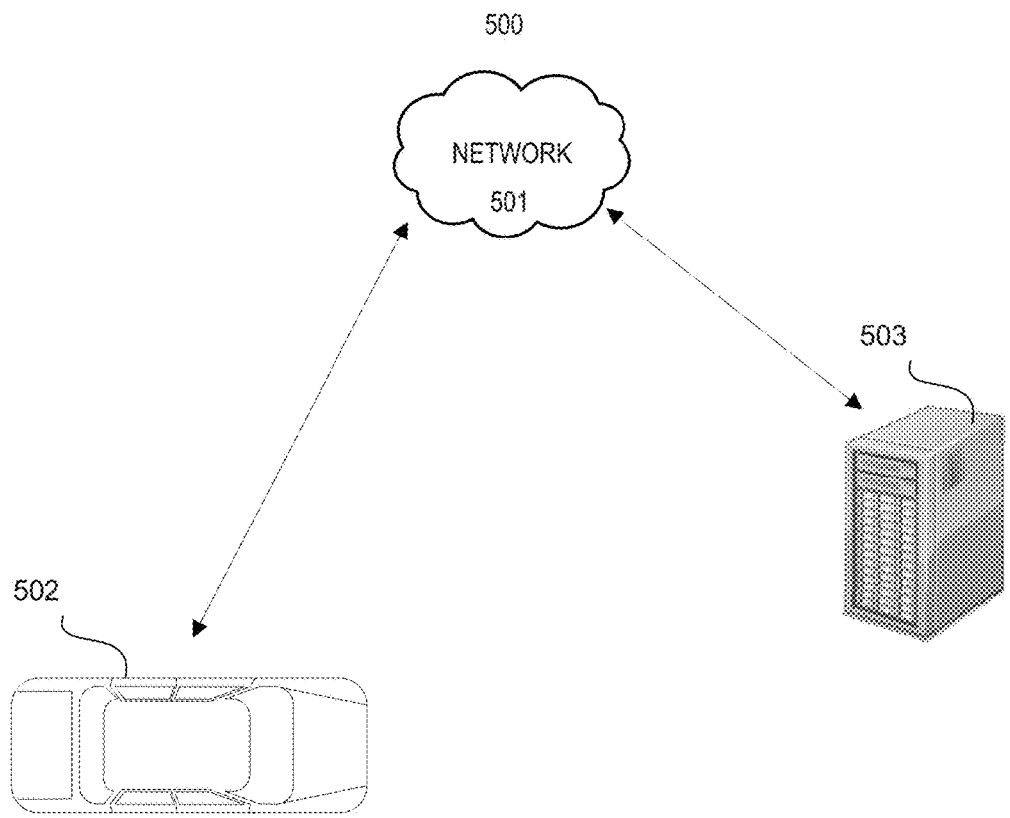
FIG. 5 illustrates an exemplary network including the vehicle system and a security authentication server, according to some embodiments.

At 25, the received security credentials may be analyzed to determine whether they are valid. This analysis may be performed by the BCM 110 according to some embodiments. According to other embodiments, the BCM 110 and/or gateway interface 10 may include a network interface configured to communicate the security credentials along with a request to analyze the security credentials to a security authentication server. FIG. 5 illustrates an exemplary system 500 where the BCM 110 and gateway interface 10 may be installed on vehicle 502. BCM 110 controls the communication of an authentication request to security authentication server 503 through network 501, where the authentication request includes the security credentials along with the request to analyze the security credentials. Network 501 may be a collection of one or more networks, including standards-based networks (e.g., 2G, 3G, 4G, Universal Mobile Telecommunications System (UMTS), GSM (R) Association, Long Term Evolution (LTE), WiMAX, Bluetooth, near field communication (NFC), WiFi (including 802.11 a/b/g/n/ac or others), WiGig, Global Positioning System (GPS) networks, and others. Further, network 501 may be a public network, such as the Internet, a private network, such as an intranet, or combinations thereof, and may utilize a variety of networking protocols now available or later developed including, but not limited to TCP/IP based networking protocols or telecommunication networking protocols.

After receiving the authentication request, security authentication server 503 may analyze the security credentials to determine whether the security credentials allow for access to restricted information stored on the vehicle CAN 100. After performing its analysis, the security authentication server 503 transmits decision information identifying whether the security credentials were valid.

If BCM 110 determines, or receives decision information, that confirms the security credentials are valid, then the access assessment tool may proceed to 26 where access to the restricted information is allowed. The restricted information may correspond to instructions for controlling the operation of one or more components that comprise a vehicle module. According to some embodiments, the security credentials may correspond to a predetermined access level that enables access to specified restricted information.

For such embodiments, the validation of the security credentials will enable access to restricted information that is within the scope of the predetermined access level identified by the validated security credentials. The predetermined access level may be formatted within a table stored on a memory included in vehicle CAN 100.

However, if the security credentials are determined to be invalid, then the access assessment tool may proceed to 27 where access to the restricted information is denied.

In addition or alternatively, the access assessment tool may further reference sensor information obtained from one or more of the vehicle modules to determine whether to allow access to restricted information.

Figure 3:
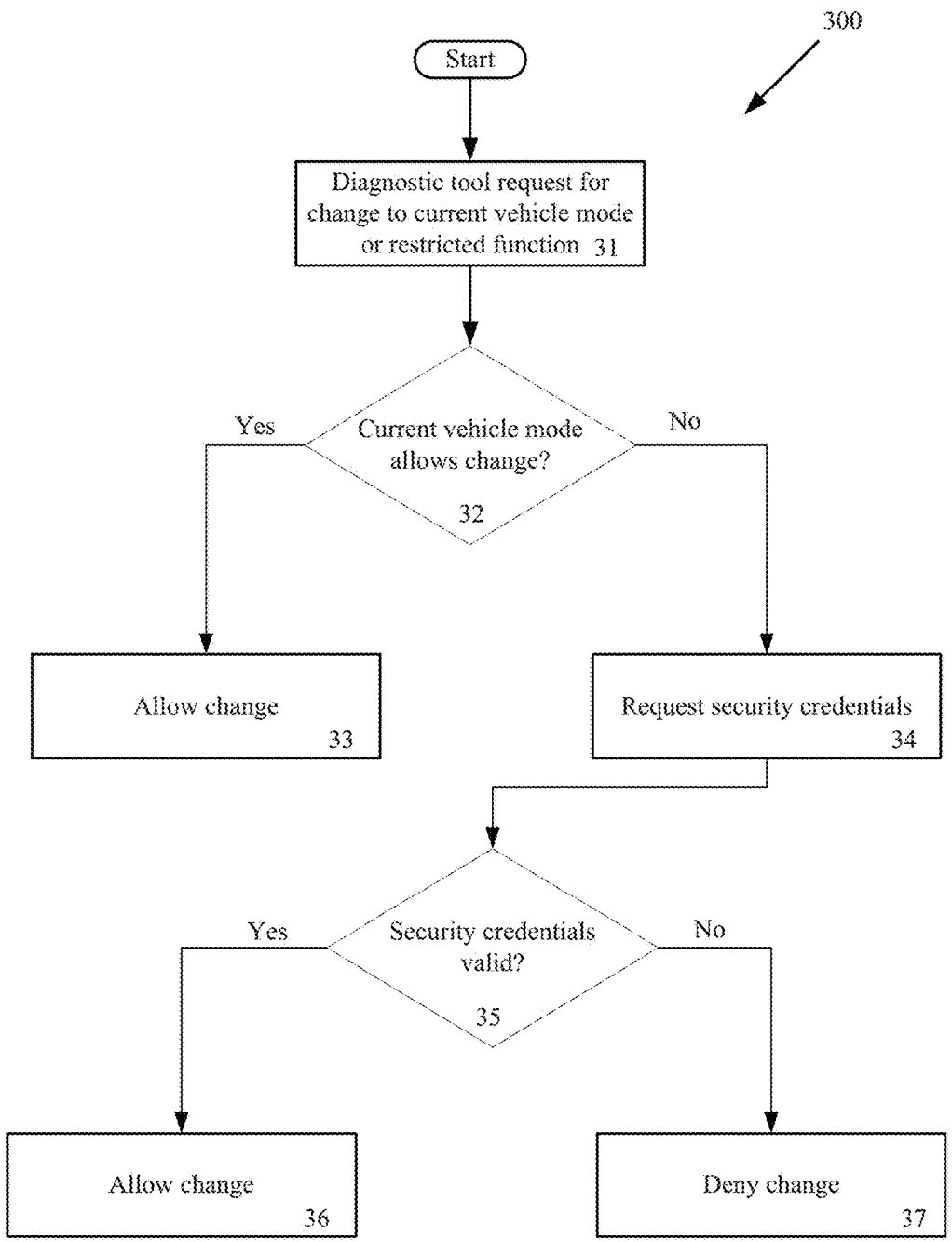
FIG. 3 illustrates a flow chart describing a process implemented by the access assessment tool, according to some embodiments.

FIG. 3 illustrates flow chart 300 that describes a process for determining whether to allow a diagnostic tool (e.g., diagnostic tool 120) to change a current vehicle mode or restricted function. The steps of the process described below is provided for exemplary purposes, as it is within the scope of this disclosure for the access assessment tool to implement a greater, or fewer, number of steps.

The diagnostic tool 120 may connect to a gateway interface (e.g., gateway interface 10) and request a change at 31. The requested change may be for a change in access setting from restricted to unrestricted within the current vehicle mode, or from restricted to unrestricted within the current vehicle mode. The requested change may also be for a change in vehicle mode that requires security credentials to be authenticated. The requested change may also be related to a restricted function for changing, modifying, or accessing certain data. For example, the requested change at 31 may include a request to perform a direct memory read by data address, a request to perform a direct memory write by data address, a request to read diagnostic identifier data, a request to write over diagnostic identifier data, a specified input/ouput control function that is identified as a restricted function, a request for diagnostic session changes to noncurrent sessions, a request to access and change execution routines that have been identified as restricted, or a request for a diagnostic session change to a module programming session. The request for change itself may include security credential information that identifies the security credentials for the user and/or diagnostic tool 120 requesting the change. The security credentials may be a password or other identifier related to the user or diagnostic tool 120.

At 32, the access assessment tool determines a current vehicle mode. For example, the current vehicle mode may be one of the Factory Mode, the Transport Mode, or the Service Mode described herein. After determining the current vehicle mode, the access assessment tool determines whether the current vehicle mode allows for the change identified in the requested change received at 31. For example, if the current access setting for the current vehicle mode allows for the change(s) identified in the request, the access assessment tool may proceed to 33 where the diagnostic tool 120 is allowed to make the requested change. Alternatively, if the current vehicle mode's current access setting is the restricted access setting that does not allow for changes to restricted functions without validating security credentials, the access assessment tool proceeds to 34.

If the current vehicle mode's access setting does not permit changes to restricted functions, then the access assessment tool proceeds to 34 where a request for security credentials is made. In some embodiments, the request for security credentials may be transmitted by the BCM 110 back to the diagnostic tool 120. In other embodiments, the security credential information may have been included in the initial request for change to a restricted function transmitted by the diagnostic tool 120 at 31.

At 35, the received security credentials may be analyzed by the access assessment tool to determine whether the security credentials are valid. This analysis may be performed by the BCM 110 according to some embodiments. According to other embodiments, the BCM 110 and/or gateway interface 10 may include a network interface configured to communicate the security credentials along with a request to analyze the security credentials to a security authentication server. For example, BCM 110 may control a request to a security authentication server to analyze the security credentials according to any one or more method described herein.

If BCM 110 determines, or receives confirmation from a security authentication server, that the security credentials are valid, then the access assessment tool may proceed to 36 where the requested change to the restricted function is allowed. The requested change may correspond to modifying restricted information for controlling the operation of one or more components that comprise a vehicle module. Therefore, by allowing the requested change, the access assessment tool may allow BCM 110 to modify operation of a vehicle module. For example, the requested change may be for a change to a default vehicle cabin temperature. According to some embodiments, the security credentials may correspond to a predetermined access level that enables specified restricted functions. For such embodiments, the validation of the security credentials will enable specified restricted functions that are within the scope of the predetermined access level identified by the validated security credentials. The predetermined access level may be formatted within a table stored on a memory included in vehicle CAN 100.

However, if the security credentials are determined to be invalid, then the access assessment tool may proceed to 37 where access to the restricted information is denied.

In addition or alternatively, the access assessment tool may further reference sensor information obtained from one or more of the vehicle modules to determine whether to allow access to restricted information.

Figure 4A:
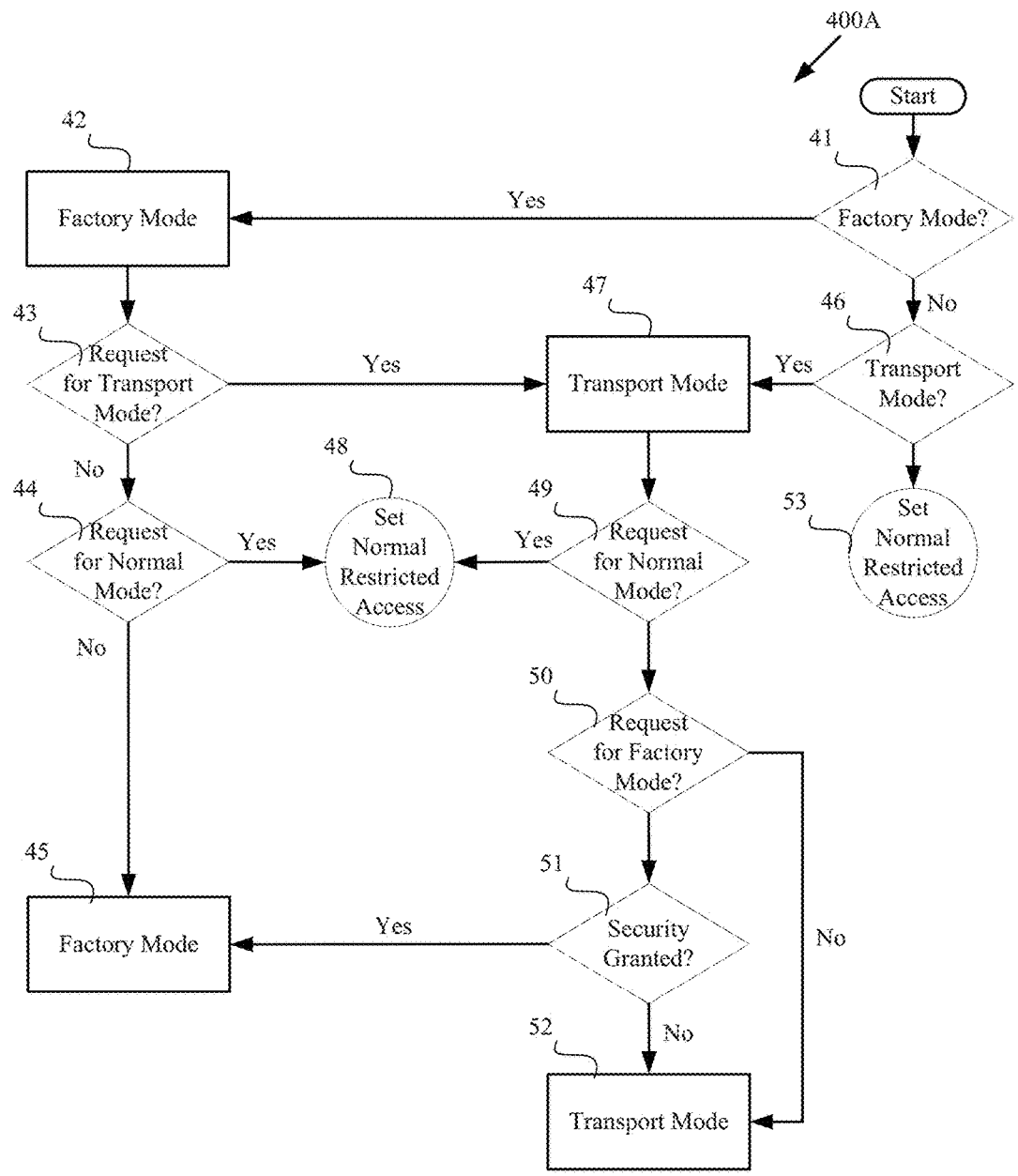
FIG. 4A illustrates a flow chart describing a process implemented by an access assessment tool, according to some embodiments.

FIG. 4A illustrates flow chart 400A that describes a process for determining a current vehicle mode (e.g., Factory Mode, Transport Mode, Service/Normal Mode) and the corresponding restriction setting for a vehicle. The steps of the process described below is provided for exemplary purposes, as it is within the scope of this disclosure for the access assessment tool to implement a greater, or fewer, number of steps.

The process begins at 41 with a determination of whether the vehicle is currently operating in the Factory Mode.

If so, at 42 the BCM 110 may understand that the vehicle is currently operating in the Factory Mode and keep a record that the current vehicle mode is the Factory Mode. The Factory Mode may have a default access setting to be unrestricted.

At 43, the BCM 110 may determine whether it has received a request to transition into the Transport Mode.

If the BCM 110 determines that a request to transition into the Transport Mode has been received at 43, then at 47 the BCM transitions into the Transport Mode and keeps record that the current vehicle mode is the Transport Mode. The Transport Mode may have a default access setting to be restricted.

If the BCM 110 determines that a request to transition into the Transport Mode has not been received at 43, then at 44 the BCM 110 may determine whether it has received a request to transition into the Normal Mode.

If the BCM 110 determines that a request to transition into the Normal Mode has been received at 44, then at 48 the BCM 110 transitions into the Normal Mode and keeps record that the current vehicle mode is the Transport Mode. The Transport Mode may have a default access setting to be restricted.

If the BCM 110 determines that a request to transition into the Normal Mode has not been received at 44, then at 45 the BCM 110 may understand that the vehicle is currently operating in the Factory Mode and keep a record that the current vehicle mode is the Factory Mode.

At 41, if the BCM 110 determines the vehicle is not currently operating in the Factory Mode, then the BCM 110 may determine whether a request to transition into the Transport Mode has been received.

If the BCM 110 determines that a request to transition into the Transport Mode has been received at 46, then at 47 the BCM 110 transitions into the Transport Mode and keeps record that the current vehicle mode is the Transport Mode.

After determining the vehicle is operating in the Transport Mode, the BCM may determine whether it has received a request to transition into the Normal mode at 49.

If the BCM 110 determines that a request to transition into the Normal Mode has been received at 49, then at 48 the BCM 110 transitions into the Normal Mode and keeps record that the current vehicle mode is the Transport Mode. The Transport Mode may have a default access setting to be restricted.

If the BCM 110 determines that a request to transition into the Normal Mode has not been received at 49, then at 50 the BCM 110 determines whether a request to transition into the Factory Mode has been received.

If the BCM 110 determines that a request to transition into the Factory Mode has been received at 50, then at 51 the BCM 110 determines whether a security access has been granted. If security access has been granted at 51, then the BCM 110 determines the vehicle is currently operating in the Factory Mode at 45. If security access has not been granted at 51, then the BCM 110 determines the vehicle is currently operating in the Transport Mode at 52.

If the BCM 110 determines that a request to transition into the Transport Mode has not been received at 46, then at 53 the BCM 110 transitions into the Normal Mode and keeps record by setting the current vehicle mode as the Normal Mode, where the Normal Mode may have a restricted access setting by default.

Figure 4B:
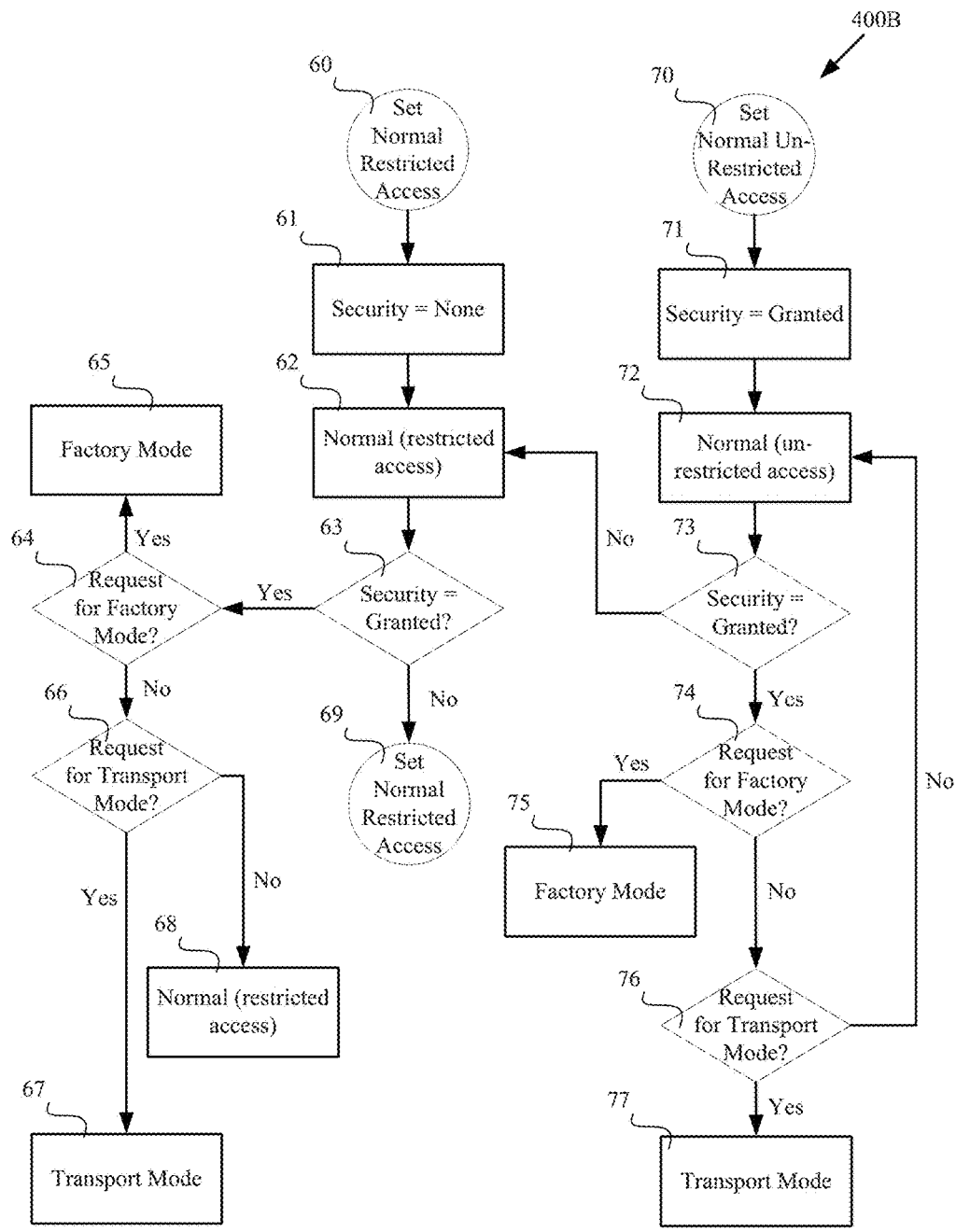
FIG. 4B illustrates a flow chart describing a process implemented by an access assessment tool, according to some embodiments.

FIG. 4B illustrates flow chart 400B that describes a process for determining a current vehicle mode (e.g., Factory Mode, Transport Mode, Service/Normal Mode) and the corresponding restriction setting for a vehicle. The steps of the process described below is provided for exemplary purposes, as it is within the scope of this disclosure for the access assessment tool to implement a greater, or fewer, number of steps. The process described by flow chart 400B may be related to the process described by flow chart 400A by sharing a same process step. For example, the identification of the Transport Mode as the current vehicle mode illustrated as step 52 in flow chart 400A may be the same as step 67 in flow chart 400B.

At 60, the BCM 110 may set the current vehicle mode as the Normal Mode, where the Normal Mode is configured to have a restricted access setting.

At 61, the BCM 110 may determine that security access has not been granted in the Normal Mode.

At 62, the BCM 110 may determine that the vehicle is currently in the Normal Mode with restricted access.

At 63, the BCM 110 may check to determine whether security access has been granted.

If security access has been granted at 63, then the BCM 110 may determine whether a request to transition into the Factory Mode has been received at 64.

If the BCM 110 determines that a request to transition into the Factory Mode has been received at 64, then at 65 the BCM 110 transitions into the Factory Mode and keeps record that the current vehicle mode is the Factory Mode. The Factory Mode may have a default access setting to be unrestricted.

If the BCM 110 determines that a request to transition into the Factory Mode has not been received at 64, then at 66 the BCM 110 determines whether it has received a request to transition into the Transport Mode.

If the BCM 110 determines that a request to transition into the Transport Mode has not been received at 66, then at 68 the BCM 110 determines the vehicle is currently in the Normal Mode with restricted access.

If the BCM 110 determines that a request to transition into the Transport Mode has been received at 66, then at 68 the BCM 110 transitions into Transport Mode.

If security access has not been granted at 63, then at 69 the BCM 110 may determine that the vehicle is currently in the Normal Mode with restricted access.

At 70, the BCM 110 may set the current vehicle mode as the Normal Mode, where the Normal Mode is configured to have an unrestricted access setting.

At 71, the BCM 110 may determine that the security access has been granted in the Normal Mode.

At 72, the BCM 110 may determine that the vehicle is currently in the Normal Mode with unrestricted access.

At 73, the BCM 110 may check to determine whether security access has been granted.

If security access has been granted at 73, then at 62 the BCM 110 may change the access setting within the Normal Mode to the restricted access setting.

If security access has not been granted at 73, then at 74 the BCM 110 may determine whether it has received a request to transition into the Factory Mode.

If the BCM 110 determines it has received a request to transition into the Factory Mode at 74, then at 75 the BCM 110 transitions into the Factory Mode and keeps record that the current vehicle mode is the Factory Mode. The Factory Mode may have a default access setting to be unrestricted.

If the BCM 110 determines that a request to transition into the Factory Mode has not been received at 74, then at 76 the BCM 110 determines whether it has received a request to transition into the Transport Mode.

If the BCM 110 determines that a request to transition into the Transport Mode has not been received at 76, then at 72 the BCM 110 determines the vehicle is currently in the Normal Mode with unrestricted access.

If the BCM 110 determines that a request to transition into the Transport Mode has been received at 76, then at 77 the BCM 110 transitions into the Transport Mode.

With respect to flow chart 400A and flow chart 400B, the BCM 110 may determine that security access has been granted, or not granted, based on whether it has received valid security credentials in accordance to any one or more of the processes for determining whether valid security credentials have been received as described herein.

Any process descriptions or blocks in the figures, should be understood as representing modules, segments, or portions of code which include one or more executable instructions, executable by a computing device, processor, or controller (e.g., control unit), for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, are merely set forth for a clear understanding of the principles of this disclosure. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
   memory to store restricted information including a default cabin temperature;
   a vehicle module;
   a gateway interface to receive a diagnostic tool; and
   a processor to:
      receive, from the diagnostic tool, a request including security credentials for the restricted information;
      determine whether to enable the diagnostic tool to modify the default cabin temperature based on the security credentials of the request; and
      control the vehicle module based on the default cabin temperature.

2. The vehicle of claim 1, wherein the processor is further configured to determine whether to allow the diagnostic tool to access the restricted information based on a current vehicle mode.

3. The vehicle of claim 2, wherein the current vehicle mode is one of a factory mode, a transport mode, or a service mode.

4. The vehicle of claim 3, wherein the current vehicle mode operates in either an unrestricted access setting or a restricted access setting.

5. The vehicle of claim 1, further comprising a network interface configured to communicate with a security server; and
   wherein the processor is further configured to:
      control the network interface to communicate the request to the security server and receive an access decision from the security server based on the security credentials; and
      determine whether to allow the diagnostic tool to access the restricted information based the access decision.

6. The vehicle of claim 1, wherein the restricted information includes diagnostic identifier data.

7. The vehicle of claim 1, wherein the processor is further configured to:
   determine whether to enable a predetermined function for modifying the restricted information based on the security credentials; and
   control operation of the vehicle module based on the restricted information.

8. The vehicle of claim 7, wherein the vehicle module includes a vehicle temperature control module.

9. The vehicle of claim 7, wherein the predetermined function includes a change to an access setting for a current vehicle mode.

10. A vehicle comprising:
    memory to store restricted information including a default cabin temperature;
    a vehicle module;
    a gateway interface to receive a connection with an external diagnostic tool; and
    a processor enabled to communicate with the memory and the gateway interface, the processor configured to:
       receive, from the external diagnostic tool, a modification request including security credentials for modifying the default cabin temperature;
       determine whether to allow modification of the default cabin temperature via the external diagnostic tool based on the security credentials; and
       control the vehicle module based on the default cabin temperature.

11. A method comprising:
    storing restricted information including a default cabin temperature of a vehicle;
    receiving diagnostic tool via a gateway interface;
    receiving, from the diagnostic tool, a request including security credentials for the restricted information;
    authenticating the diagnostic tool based on the security credentials;
    determining whether to enable the diagnostic tool to modify the default cabin temperature based on the security credentials; and
    controlling a vehicle module based on the default cabin temperature.

12. The method of claim 11, further including determining whether to allow the diagnostic tool to access the restricted information based on authentication of the diagnostic tool and a current vehicle mode.

13. The method of claim 12, wherein the current vehicle mode is one of a factory mode, a transport mode, or a service mode.

14. The method of claim 13, wherein the current vehicle mode operates in either an unrestricted access setting or a restricted access setting.

15. The method of claim 11, further comprising:
    controlling communication of a validation request to a security server, the validation request including the security credentials;
    receiving an access decision from the security server based on the security credentials; and
    determining whether to allow the diagnostic tool to access the restricted information based the access decision.

16. The method of claim 11, wherein the restricted information includes diagnostic identifier data.

17. The method of claim 11, further comprising:
    determining whether to enable a predetermined function for modifying the restricted information based on the security credentials included in the access request; and
    controlling operation of the vehicle module based on the restricted information.

18. The method of claim 17, wherein the vehicle module includes a vehicle temperature control module.

19. The method of claim 17, wherein the predetermined function includes a change to an access setting for a current vehicle mode.

20. The method of claim 11, further including determining whether to allow the diagnostic tool to access the restricted information based on sensor information obtained from the vehicle module.

* * * * *